Nov. 1, 1932.    G. W. COPLAND    1,886,085
OIL TESTER
Filed June 14, 1928
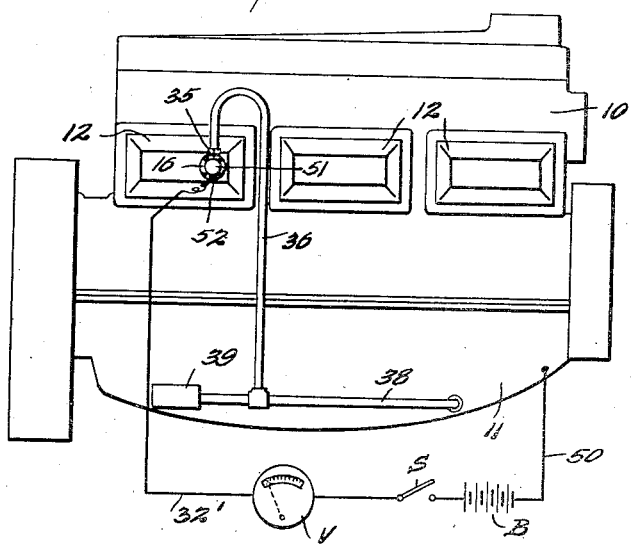
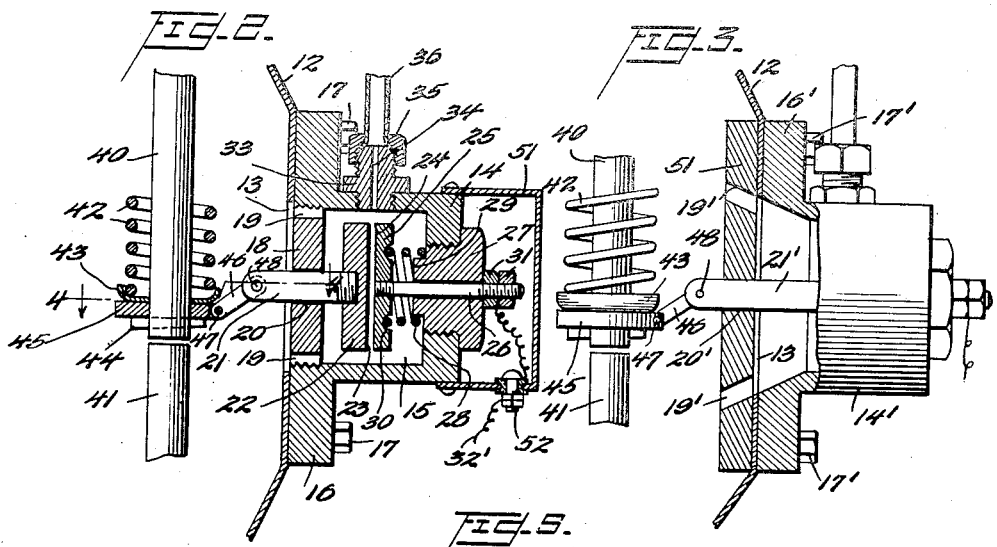
Inventor
G. W. Copland
By Watson, Coit, Morse & Grindle
Attorney Patented Nov. 1, 1932

1,886,085

UNITED STATES PATENT OFFICE

GEORGE W. COPLAND, OF LAWRENCE, NEW YORK

OIL TESTER

Application filed June 14, 1928. Serial No. 285,420.

This invention relates to a method of and apparatus for testing the dilution of or the relative viscosity of lubricating oil.

More particularly, the invention comprises a method of and apparatus for determining and indicating to the driver of an automotive vehicle the condition of the oil contained in the crank case of the engine.

One of the features of the invention consists in providing an apparatus comprising a pair of relatively movable electrical conducting surfaces which are periodically brought into contact and again separated. Means are provided for applying the oil to be tested to at least one of these surfaces while they are separated. The two surfaces are normally insulated from each other and are pressed together with a substantially constant pressure resisted by a suitable spring. If the oil to be tested is of sufficient viscosity, it will not be forced out from between the surfaces in the relatively short period of applied pressure, and no contact of an electrical nature will occur between the surfaces. If, however, the oil is much diluted and its viscosity relatively low, then the oil film will be squeezed out and electrical contact will take place between the surfaces which can be indicated on the dash of the vehicle in any suitable manner.

Another feature of the invention consists in the method of testing the viscosity of oil by pressing a sample of the same between two conducting surfaces resiliently held together for a short period and determining whether or not the oil maintains these surfaces out of electrical contact.

Other and further objects and features of the invention will be more apparent to those skilled in the art upon a consideration of the accompanying drawing and following specification, wherein are disclosed two exemplary embodiments of the invention with the understanding, however, that various changes may be made therein such as fall within the scope of the appended claims, without departing from the spirit of the invention.

In said drawing:

Figure 1 is a side elevation of an internal combustion engine having the present invention applied thereto;

Figure 2 is a partial transverse section on the line 2—2 of Fig. 1;

Figure 3 is a view similar to Fig. 2, but showing a modification of the tester housing;

Figure 4 is a section on the line 4—4 of Fig. 2; and

Figure 5 is an elevation of a part of the device of Fig. 2.

The present invention is disclosed as applied to an internal combustion engine of the type used on automotive vehicles and is shown as having the relative periodical motion applied to the conducting surfaces from one of the reciprocating valve stems of such an engine. It will be understood, however, that such motion may be applied from any moving part of the engine and it is not the intent of this application to limit the invention to motion as applied by a valve stem.

Referring to the drawing, there is seen at 10 a conventional form of internal combustion engine having the crank case 11, usually forming a sump for lubricating oil, and the valve cover plates 12 covering the valve stems and tappet assemblies. The device of the present invention is preferably mounted on one of the valve cover plates, as seen in Fig. 2, where the plate is shown in section. A suitable opening 13 is cut through the plate and the cup-shaped housing 14 of insulating material applied so that the interior 15 of this housing is open to the compartment covered by the plate 12 through the opening 13. Preferably the housing 14 has an integral peripheral flange 16 which is suitably bolted or otherwise secured, by means of the fastenings 17, to the outer surface of the valve cover plate 12. Screwed or otherwise fastened into the open end of the housing 14 is the disk 18 of steel or other suitable metal having the serrations 19 in the edge thereof to provide drain openings from the compartment 15 into the valve chamber.

Journaled for reciprocation in a central opening 20 in the disk 18 is the stem 21 having secured on its inner end the metal disk 22 preferably circular in cross section and 1 having the plane face 23. Confronting this face 23 is the face 24 of a similar disk 25 rigidly mounted on the stem 26 slidably engaged in and passing through the metal bushing 27 which is screwed or otherwise fastened in the outer or end wall of the casing 14. A suitable coil spring 28 is interposed between the rear face of the disk 25 and the inner end of the bushing 27 and surrounds the boss 29 on the bushing. To assist in maintaining the spring in position, the other end thereof may be conveniently seated in a groove 30 in the disk 25. The outer end of the stem 26 is threaded to receive the lock nuts 31 which limit the inward movement of the disk 25 and stem 26 under the action of the spring 28. Conveniently, the wire 32 may be clamped between the lock nuts 31 for a purpose to be later described.

The bushing 33 of suitable metal is threaded into the upper wall of the casing 14 and provided with a restricted passage 34. The outer end of this bushing is conveniently shaped to receive the coupling 35 which secures the oil pipe 36 to the bushing. As shown in Fig. 1, this oil pipe 36 leads from a main oil manifold 38 preferably connected directly to the oil pump 39 so as to supply a quantity of oil directly from the pump to the interior of the compartment formed by the casing 14. The restricted opening 34 is graduated to limit the quantity of oil flowing so as not to materially lower the pressure of the oil supplied to the bearing of the engine by means of branches from the manifold 38. The lower end of the opening 34 in the bushing is directly over the faces of the confronting disks so that oil issuing from this opening will spread over these faces when they are separated and form a film thereon.

The disk 22 is adapted to be reciprocated periodically so that it is brought into contact with the disk 25 with sufficient pressure to slightly flex the spring 28 and this reciprocation is conveniently produced directly from a valve stem such as 40 which, as is well known, is vertically reciprocated by means of the tappet 41 driven from the cam shaft of the engine (not shown). The valve stem 40 is provided with a conventional valve spring 42 surrounding the same and being seated in a cup 43 near the lower end of the valve stem which is normally held in position on the stem by means of a transverse pin 44 passing through an opening in the stem. To apply the device of the present invention, the collar 45 is applied over the valve stem and beneath the cup washer 43 before the pin 44 is inserted, and then the pin is inserted beneath this collar 45 to retain the same in position and in fixed relation to the end of the valve stem. When the valve is seated the collar 45 assumes the position shown in Fig. 2, materially below the center line of the stem 21 to which it is connected by means of the link 46 suitably pivoted at 47 and 48 in slots respectively in the collar and the stem 21. When the valve stem is lifted by the action of the cam on the tappet, the collar rises and the link 46 straightens out and presses the stem 21 and with it the disk 22 inward until it engages the disk 25.

Each time the valve is reciprocated the disks will be brought together and again separated. The time of contact of the disks in rated. The time of contact of the disks in any case will be extremely short and will be proportional to the speed of the engine. The time of separation of the disks will be in direct proportion to the time of contact. Each time the disks are separated, a quantity of oil, more or less in proportion to the time of separation, is squirted between them and when they are pressed together this oil is spread out over the confronting faces of the disks and, if it is sufficiently diluted with products of combustion and gasoline which has leaked by the piston rings, it will be of such low viscosity that it will be quickly squeezed out from between the disks and they will come into electrical engagement with each other. If the oil is of comparatively heavy consistency or not much diluted, it will not be able to be squeezed out from between the disks in the short time that they are in contact, since the spring 28 will be compressed and no electrical engagement between the disks will be effected. To some extent, the relative "oiliness" of the lubricant will be a determining factor in whether or not electrical engagement takes place, and since this quality of oiliness is what determines the value of the lubricant, it will be seen that this device, which estimates its quality, will be of considerable value to the motorists.

The expression "oiliness" is used to indicate the quality of the oil which is not properly expressed either by viscosity or body but which refers more particularly to the quality of slipperiness which is a combination of viscosity and the carbon content of the oil i. e. the small particles of carbon caused by improper combustion in the engine.

The disk 22 will be in electrical engagement with the whole frame of the engine through its connection with the valve mechanism, whereas the disk 25, being supported from the insulating casing 14, will be insulated from the engine frame. Therefore, if a battery and a suitable indicator are connected between the stem 26 and the frame of the engine, the operator can determine the condition of the oil by observing the indicator.

Preferably, as shown, the indicator comprises a suitable voltmeter V connected in circuit by the wires 31 and 50 between the stem 26 and any metal part of the motor 10.

A suitable battery B and switch S are also connected in this circuit, as shown. When the switch is closed, if the condition of the oil is poor, electrical contact will be made between the disks 22 and 25 each time the valve stem is reciprocated, and a current will pass from the battery through the voltmeter and deflect the needle thereof. If the voltmeter is of the well damped type, the rapid pulsations of current flowing through the same will cause the needle to remain deflected. To some extent, the amount to deflection may be used to judge the degree of dilution of the oil. Of course, if the oil is of good quality and undiluted, the film thereof on the disks will not be broken and there will be no contact between the two disks and hence no deflection of the meter needle. The switch S may be the usual ignition switch. It may be supplemented by a series connected push button to be used when it is desired to determine the condition of the oil.

Fig. 3 shows a slight modification in the method of mounting the casing which contains the reciprocating disks. Here the flange 16' on the casing 14' abuts the outer surface of the valve cover plate 12 and a plate 51 of steel or the like abuts the inner face of the plate over substantially the same area covered by the flange 16'. The valve cover plate, of course, has the usual opening 13 therein. The plate 51 has a central opening 20' to form the bearing and guide for the stem 21' and is provided with a series of holes 19' through which the oil may drain out of the casing into the valve compartment. The bolts 17' pass through the plate 51 as well as the flange 16' and the valve cover plate 12 to hold the whole assembly together. Otherwise the constructions of Figs. 2 and 3 are substantially identical. The form shown in Fig. 2 is to be preferred, since its construction is simpler and the alignment of the disk 18 can be more readily effected. Furthermore, additional space is provided between the valve stem and the reciprocated stem 21, thus reducing the angularity of the link 46.

In each modification it may be desirable to enclose the movable stem 26 where it projects beyond the bushing 27. For this purpose a cup 51 such as shown in Fig. 2 may be secured over the cylindrical portion of the housing 14. It may be provided with an opening bushed with insulating material, as shown, for the passage of the bolt 52 to the inner end of which the flexible lead wire 32 may be attached. The outer end of the bolt serves for the reception of the wire 32' leading from the instrument.

Having thus described the invention, what is claimed as new and desired to be secured by Letters Patent is:

1. In a device for testing the dilution of oil in an internal combustion engine, in combination, a pair of elements having confronting, complementary surfaces, means associated with said engine to cause periodic relative movement between said elements to alternately attempt to engage and separate said surfaces, resilient means supporting one of said elements and flexed when they are attempting to engage, means to apply a fresh quantity of oil from the engine supply to said surfaces when separated and means to indicate positive contact of said surfaces with each other.

2. In a device for testing the dilution of oil in an internal combustion engine, in combination, a pair of elements having confronting surfaces, means associated with said engine to cause said surfaces to alternately advance toward and separate from each other, a resilient mounting for one of said elements flexed by attempted engagement of the elements, means to periodically apply oil from the engine supply to one of said surfaces during separation and means to indicate a positive contact between said surfaces.

3. In a device for testing the viscosity of oil in an internal combustion engine crankcase, in combination, a pair of confronting discs, one spring mounted, means actuated by the engine to periodically press said discs together with a film of the engine oil to be tested between them, means to continuously renew said oil from the crankcase, and means to determine the electrical conductivity of said film.

4. In a device for testing the viscosity of oil in an internal combustion engine crankcase, in combination, a pair of confronting conducting surfaces, one spring mounted, means actuated by the engine to periodically press said surfaces together with a film of the oil to be tested between them, means to continuously renew said oil from the crankcase, said surfaces being included in an electrical circuit and means in said circuit to indicate electrical contact between said surfaces.

5. In a device for testing the consistency of oil, in combination, a pair of discs normally positioned with their faces spaced apart and opposed, means to supply oil between said discs, means to move one disc at least the distance between said faces, means to relieve one disc and means to determine the occurrence of contact between said faces.

6. In a device for testing the consistency of oil, in combination, a pair of discs having testing faces normally spaced apart, one of said discs being resiliently mounted, means to supply oil to the face of one of said discs, means to move one disc toward the other to press the oil therebetween for a short interval, and means to indicate actual engagement of said discs.

7. In a device for testing the consistency of oil, in combination, a pair of discs having testing faces normally spaced apart, one of said discs being resiliently mounted, means to supply oil to the face of one of said discs, a carrier for one of said discs, means to move said carrier toward said other disc a distance greater than the normal distance between said faces, and means to indicate actual engagement of said discs.

8. In a device for testing the consistency of oil, in combination, a pair of plates, means to periodically cause relative movement of said plates toward each other, means yieldingly mounting one of said plates, means to supply a new quantity of oil between and on the facing surfaces of the plates when separated, means insulating said plates from each other, a circuit including said plates, a source of current and an indicating device whereby if the oil film is broken down by the pressure of said plates the circuit will be completed to operate said indicating device.

9. In a device for testing the viscosity of oil in an internal combustion engine, in combination, a pair of plates having conducting surfaces, means associated with a moving part of the engine to periodically move one of the plates to bring the said surfaces toward each other and then to separate them, one of the plates being resiliently mounted to provide a predetermined pressure of contact between the surfaces, means to apply a fresh quantity of oil from the engine to the said surfaces each time they separate and means to indicate the occurrence of electrical contact between said surfaces.

In testimony whereof I hereunto affix my signature.

GEORGE W. COPLAND.